Dec. 22, 1942.  J. W. LIVINGSTON ET AL  2,305,971
SPEED RESPONSIVE APPARATUS
Filed Oct. 15, 1941
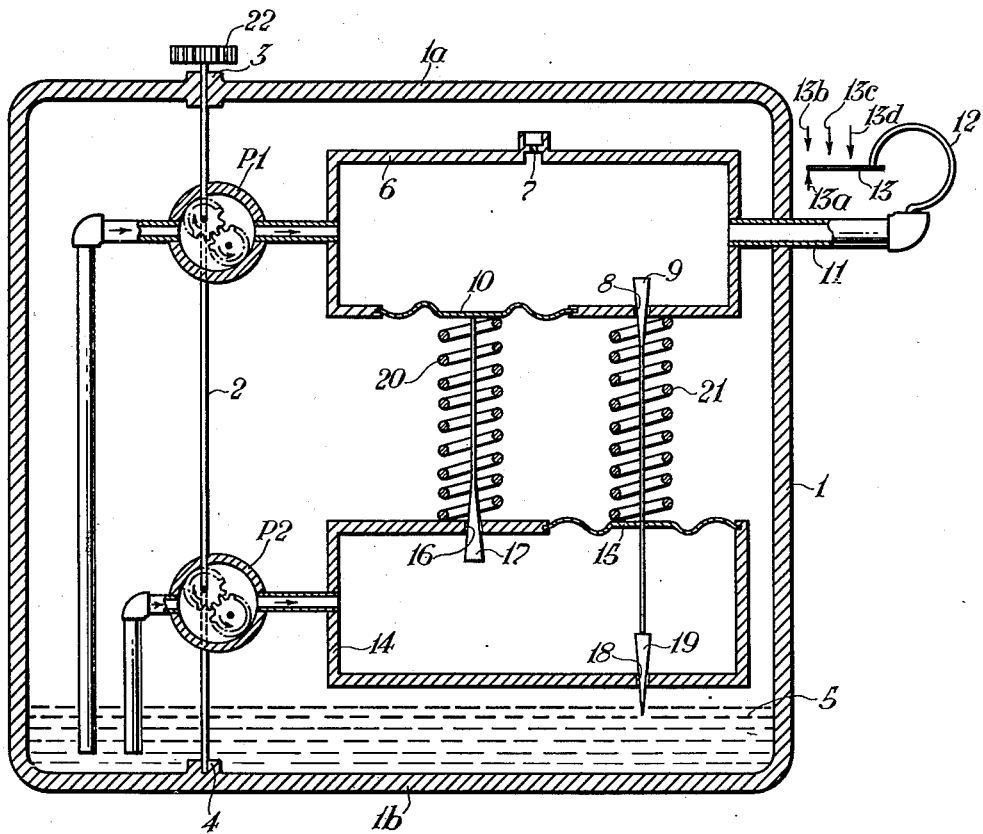
INVENTORS
John W. Livingston
and Herbert L. Bone
BY
THEIR ATTORNEY Patented Dec. 22, 1942

2,305,971

UNITED STATES PATENT OFFICE 2,305,971

SPEED RESPONSIVE APPARATUS

John W. Livingston and Herbert L. Bone, Forest Hills, Pa., assignors to The Union Switch & Signal Company, Swissvale, Pa., a corporation of Pennsylvania Application October 15, 1941, Serial No. 415,033

4 Claims. (Cl. 264—14)

Our invention relates to speed responsive apparatus, and particularly to governors of the hydraulic type.

One of the simplest forms of hydraulic governors consists of a pump of the gear or vane type arranged to pump fluid into a chamber having a fixed orifice, the speed being determined by measuring the pressure of the fluid built up in the chamber. This type of governor is open to the disadvantage that the pressure of the fluid built up in the chamber is also a function of the viscosity of the fluid, and the governor is therefore not accurate unless the fluid is maintained at the same viscosity. In actual practice, it is difficult to maintain the fluid at the same viscosity since the governors are frequently subjected to temperature changes between zero and 100° F., and this change in temperature causes a considerable change in viscosity of all ordinary fluids which are suitable for use in a fluid governor.

One object of our present invention is the provision in a hydraulic governor of means for automatically compensating for changes in the viscosity of the fluid, so that the fluid pressure in the pressure chamber will always be a direct indication of the pump speed.

According to our invention, we employ a first fluid pump discharging fluid into a first chamber provided with a fixed orifice and a variable orifice. We also provide a second fluid pump operated at the same speed as the first pump and discharging fluid into a second chamber provided with two variable orifices the opening in one of which is varied in response to variation in the pressure in the first chamber to maintain the pressure in the second chamber constant for a preselected viscosity of the fluid, and the opening in the other of which is varied in response to changes in pressure in the second chamber due to changes in viscosity of the fluid, whereby the opening of the second orifice is a measure of the viscosity of the fluid. We further vary the opening of the variable orifice in the first chamber in accordance with the opening of said other variable orifice in the second chamber in a manner to compensate for changes in viscosity measured by means of the second chamber. We determine the speed by measuring the pressure built up in the first chamber.

Other objects and characteristic features of our invention will become apparent as the description proceeds.

We shall describe one form of speed responsive apparatus embodying our invention, and shall then point out the novel features thereof in claims.

The accompanying drawing is a diagrammatic view showing one form of apparatus embodying our invention.

Referring to the drawing, the reference characters P1 and P2 designate two similar fluid pumps which may be of any suitable type, but which are here illustrated as being of the well-known gear type. These pumps are disposed within a fluid tight housing 1, and are arranged to be driven at the same speed by a shaft 2 journaled in bearings 3 and 4 provided in the top and bottom walls 1a and 1b of the housing 1. The upper end of the shaft 2 projects outside of the housing 1, and is provided with a driving gear 22 by means of which the shaft may be driven at a speed which is proportional to the speed of any device whose speed it is desired to have the governor respond to.

The housing 1 is partly filled with fluid 5 which may be oil, and the pump P1 pumps fluid from the bottom of the housing into a chamber 6. The chamber 6 is provided with a fixed orifice 7 and with a variable orifice 8 the size of the opening of which is arranged to be varied by a needle vent valve 9. The chamber 6 is also provided with a movable diaphragm 10 and with a pipe 11 which leads to a pressure responsive device, here shown as a Bourdon tube 12. The Bourdon tube 12 is provided with a back contact 13—13a which is closed when the pressure to which the tube 12 is subjected is below a predetermined value and with a plurality of front contacts 13—13b, 13—13c and 13—13d which close successively as the pressure to which the tube 12 is subjected increases.

The pump P2 pumps fluid from the bottom of the housing 1 into a chamber 14 which is provided with a movable diaphragm 15, and with two variable orifices 16 and 18, the size of the openings of which may be varied by means of needle vent valves 17 and 19, respectively.

The diaphragm 10 in chamber 6 is biased to an upper position by means of a compressed coil spring 20, and is connected to the needle valve 17 in such manner that the area of the opening of the variable orifice 16 is proportional to the pressure of the fluid in chamber 6.

The diaphragm 15 in chamber 14 is biased downwardly by a spring 21 and is connected to the needle valves 9 and 19. All of the orifices discharge fluid into the housing 1 to enable it to be recirculated by the pumps P1 and P2.

With the apparatus constructed in the manner described it will be apparent that when the pumps P1 and P2 are operating the fluid which is discharged into the chambers 6 and 14 will tend to build up pressures in these chambers. The amount of the pressure which is built up in chamber 6 is determined primarily by the rate of discharge from orifice 7 which is a fixed orifice, and as this pressure increases the diaphragm 10 will deflect an amount which depends upon this pressure and the force exerted by spring 20, The deflection of the diaphragm 16 will operate the needle valve 17 in the direction to increase the area of the opening of the variable orifice 18, and the parts are so proportioned that for some fixed assumed viscosity of the fluid, the pressure in chamber 14 will remain constant as the pressure in chamber 6 increases. It follows that the proportions of needle valve 17 depend upon the relative discharge rates of pumps P1 and P2, and the characteristics of spring 20, but not upon changes in the viscosity of the fluid 5.

When the viscosity of the fluid 5 increases, the pressure in chambers 6 and 14 will both tend to increase due to the increase in viscosity. This increase in pressure in chamber 14 will deflect diaphragm 15 in opposition to the bias of spring 21 and will cause needle valve 19 to increase the area of the opening of the variable orifice 18 until a point of equilibrium is reached. It follows that the area of the orifice 18 will be a measure of the viscosity of the fluid 5, and that, since this area depends upon the amount of motion of this needle valve, the motion of this needle valve will also be a measure of the viscosity of the fluid. Inasmuch as needle valve 9 is connected to needle valve 19 any movement of the needle valve 19 will be accompanied by a corresponding movement of needle valve 9, and this latter valve is so designed that the resultant changes in the area of the opening of the variable orifice 8 will compensate for any variations in the pressure of the fluid in chamber 6 which would occur due to changes in the viscosity of the fluid if this orifice were not provided.

It will be seen, therefore, that with a governor constructed in accordance with our invention the pressure built up in chamber 6 will be independent of changes in the viscosity of the fluid, and that the measure of this pressure by means of the Bourdon tube 12 and associated contacts will be an accurate measure of the speed of the pump P1.

Although we have herein shown and described only one form of speed responsive apparatus embodying our invention, it is understood that various changes and modifications may be made therein within the scope of the appended claims without departing from the spirit and scope of our invention.

Having thus described our invention, what we claim is:

1. A hydraulic governor comprising a first fluid pump discharging fluid into a first chamber provided with a fixed orifice, a variable orifice and a diaphragm the displacement of which is proportional to the pressure of the fluid in said first chamber; a second fluid pump discharging fluid into a second chamber provided with two variable orifices and with a diaphragm the displacement of which is proportional to the pressure of the fluid in said second chamber; means controlled by the diaphragm in said first chamber for varying the opening of the one variable orifice in said second chamber to hold the pressure in the second chamber constant at a selected viscosity of the fluid, means controlled by the diaphragm in the second chamber for varying the opening of the other variable orifice in said second chamber in such manner that the opening of said other variable orifice will be proportional to the viscosity of the fluid, and means for varying the opening of the variable orifice in the first chamber in accordance with variations in the opening of said other variable orifice to compensate in the first chamber for changes in the pressure due to changes in the viscosity of the fluid measured by means of the second chamber.

2. A hydraulic governor comprising a first fluid pump discharging fluid into a first chamber provided with a fixed orifice, a variable orifice and a diaphragm the displacement of which is proportional to the pressure of the fluid in said first chamber; a second fluid pump discharging fluid into a second chamber provided with two variable orifices and with a diaphragm the displacement of which is proportional to the pressure of the fluid in said second chamber; means controlled by the diaphragm in said first chamber for varying the opening of the one variable orifice in said second chamber to hold the pressure in the second chamber constant at a selected viscosity of the fluid, means controlled by the diaphragm in the second chamber for varying the opening of the other variable orifice in said second chamber in such manner that the opening of said other variable orifice will be proportional to the viscosity of the fluid, means for varying the opening of the variable orifice in the first chamber in accordance with variations in the opening of said other variable orifice to compensate in the first chamber for changes in the pressure due to changes in the viscosity of the fluid measured by means of the second chamber, and pressure responsive control means controlled in accordance with the pressure in said first chamber.

3. A hydraulic governor comprising a first fluid pump discharging fluid into a first chamber provided with a fixed and a variable orifice, means including a second fluid pump operated at the same speed as the first pump for discharging fluid into a second chamber, means responsive to the pressure of the fluid in said first chamber for maintaining the pressure of the fluid in said second chamber constant for a predetermined viscosity of the fluid, means responsive to a change in pressure in the second chamber due to a change in the viscosity of the fluid for controlling the opening of said variable orifice to compensate for changes in the pressure in the first chamber due to changes in viscosity of the fluid, and speed indication means responsive to the pressure in said first chamber.

4. A hydraulic governor comprising a first fluid pump discharging fluid into a first chamber provided with a fixed and a variable orifice, means including a second fluid pump operated at the same speed as the first pump for discharging fluid into a second chamber, means responsive to the pressure of the fluid in said first chamber for maintaining the pressure of the fluid in said second chamber constant for a predetermined viscosity of the fluid, means responsive to a change in pressure in the second chamber due to a change in the viscosity of the fluid for controlling the opening of said variable orifice to compensate for changes in the pressure in the first chamber due to changes in viscosity of the fluid, and a Bourdon tube subjected to the pressure of the fluid in said first chamber.

JOHN W. LIVINGSTON.
HERBERT L. BONE.